Figure 1:
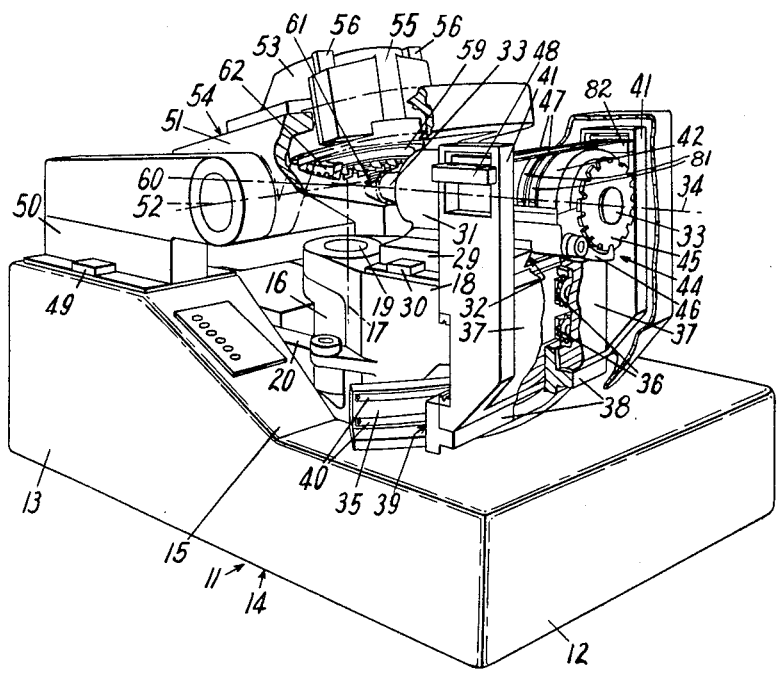

Sept. 21, 1965    T. M. DEAKIN    3,207,039
GEAR PRODUCING MACHINES

Filed Jan. 7, 1963    4 Sheets-Sheet 1

*Inventor*
Thomas Meyrick Deakin

By *Morris & Bateman*
    *Attorneys*

Inventor
Thomas Meyrick Deakin

By Morris & Bateman
Attorneys

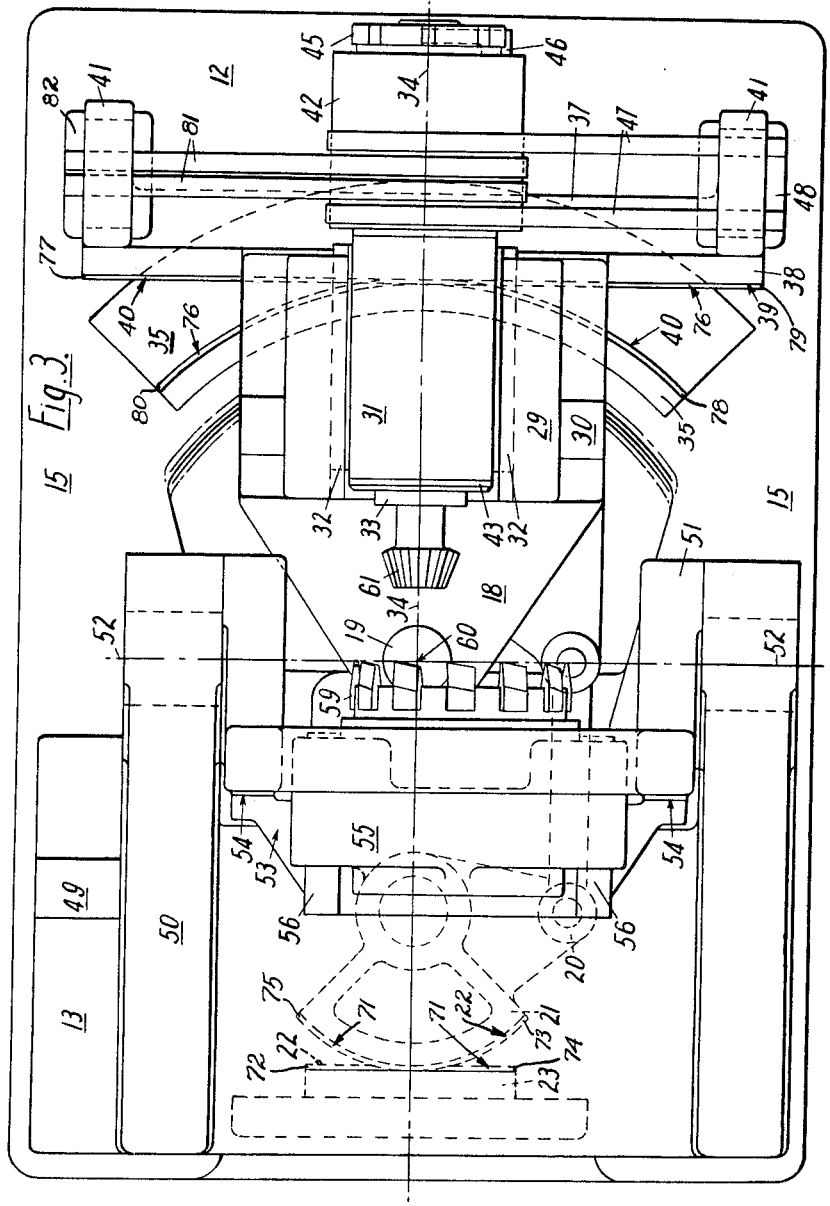

Sept. 21, 1965
T. M. DEAKIN
3,207,039
GEAR PRODUCING MACHINES
Filed Jan. 7, 1963
4 Sheets-Sheet 4
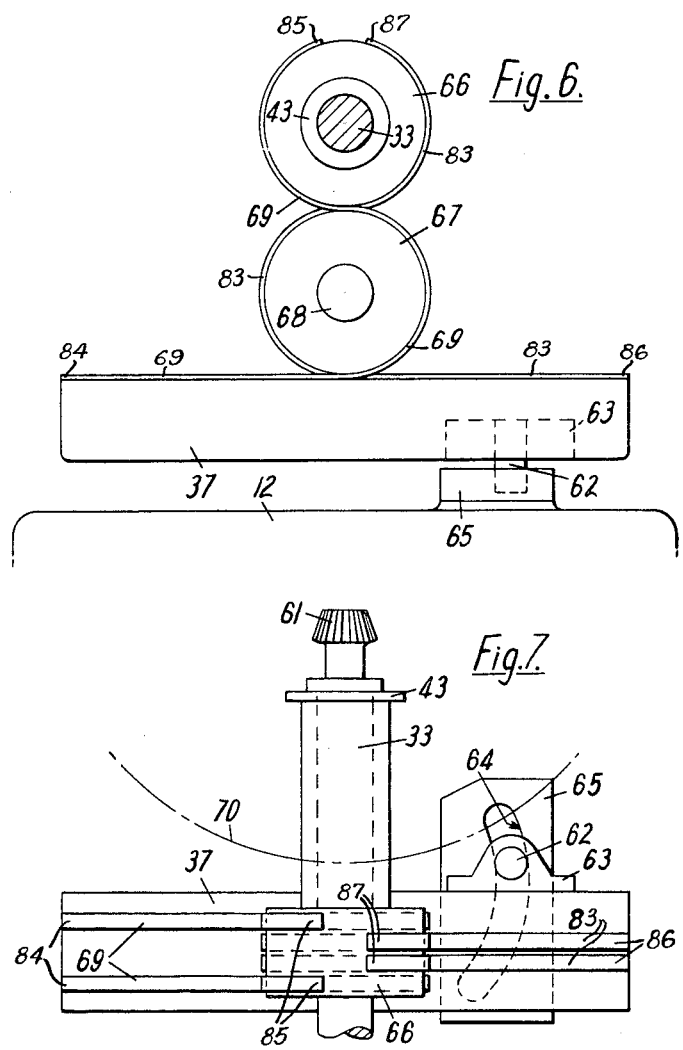
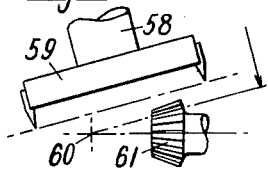
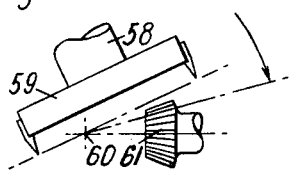
Inventor
Thomas Meyrick Deakin
By
Attorneys

United States Patent Office 3,207,039
Patented Sept. 21, 1965

3,207,039
GEAR PRODUCING MACHINES
Thomas Meyrick Deakin, Altrincham, England, assignor to David Brown Industries Limited
Filed Jan. 7, 1963, Ser. No. 249,645
Claims priority, application Great Britain, Jan. 13, 1962, 1,322/62
17 Claims. (Cl. 90—6)

The invention relates to machines for producing bevel and hypoid gears, and more particularly, but not exclusively, to machines for producing longitudinally curved tooth bevel and hypoid gears.

Bevel and hypoid gears can be generated by an intermittent indexing process which comprises moving a workpiece relative to a tool as though it were rotating in mesh with a gear of which one tooth flank surface is represented by the surface swept out by the tool. Alternatively, such gears can be formed by an intermittent indexing process without any generating motion, that is to say without any movement of the workpiece relative to the tool as though it were rotating in mesh with a gear of which one tooth flank surface is represented by the surface swept out by the tool, such that the tooth surfaces produced are exact counterparts in shape to the surface swept out by the tool. The words "generated" and "formed" have the meanings defined above where used hereinafter.

If both gears of a pair are generated by moving each workpiece relative to a tool as though it were rotating in mesh with an imaginary basic crown wheel of which one tooth flank surface is represented by the surface swept out by the tool, each set of tooth flanks of each gear is produced by a separate operation and both the teeth and tooth gaps are tapered in width at any fixed distance from their tips and bases respectively. Two mating gears produced in this way run together efficiently and relatively silently, but a total of four operations is required.

If both sets of tooth flanks of a bevel or hypoid gear are produced simultaneously by a forming operation, the tooth gaps are parallel in width at any fixed height above their bases, although said gaps normally appear to be parallel in width only at their bases because of the depthwise taper normally provided. It is therefore essential to produce the two sets of tooth flanks of the mating gear separately so as to provide said gear with teeth which are parallel in width at any fixed distance below their tips, although said teeth normally appear to be parallel in width only at their tips because of the depthwise taper normally provided. Thus the total number of operations required to produce a pair of gears can be reduced to three, but if all of said operations were forming operations it would be extremely difficult, if not impossible, to attain a standard of accuracy enabling said gears to run together efficiently.

It is therefore a common practice to produce one gear of a pair, and preferably the larger one, by forming both sets of its tooth flanks simultaneously, and to generate the other gear of the pair by producing its two sets of tooth flanks by separate operations each of which comprises moving the workpiece relative to a tool as though it were rotating in mesh with the non-generated mating gear of which one tooth flank surface is represented by the surface swept out by the tool. This enables two gears which will run together efficiently to be produced in three operations.

The object of the present invention is to provide an improved machine for generating bevel and hypoid pinions which will run efficiently in mesh with non-generated bevel and hypoid wheels.

According to the invention, a machine for producing bevel and hypoid gears by moving a workpiece relative to a tool or tools as though said workpiece were rotating in mesh with a non-generated mating gear of which one tooth flank surface is represented by the surface swept out by the tool or tools, comprises means for oscillating the workpiece simultaneously about two different axes one of which lies in a plane perpendicular to the other. Preferably, the machine comprises a fixed bed; a worktable oscillatable on said bed; a work spindle carried by the worktable and oscillatable about its own axis which lies in a plane perpendicular to the axis about which the worktable is oscillatable; a member carried by the worktable for reciprocatory movement at a tangent to a circle the center of which lies on the axis of the work spindle; means for producing said reciprocatory movement by constraining the member to move, during oscillation of the worktable, in such a manner that any point on said member moves, relative to the bed, in an involute curve the centre of the base circle of which lies on the axis of the worktable; and means for converting reciprocatory movement of the member into oscillatory movement of the work spindle about its axis. Preferably, also, the means for converting reciprocatory movement of the member into oscillatory movement of the work spindle about its axis comprise an arcuate surface connected coaxially to the work spindle, said surface being connected by non-slipping means to the member. Preferably, the constraining means comprise a stationary arcuate surface coinciding with said base circle and connected by non-slipping means to the member. The non-slipping means preferably comprise flexible steel tapes.

Figure 2:
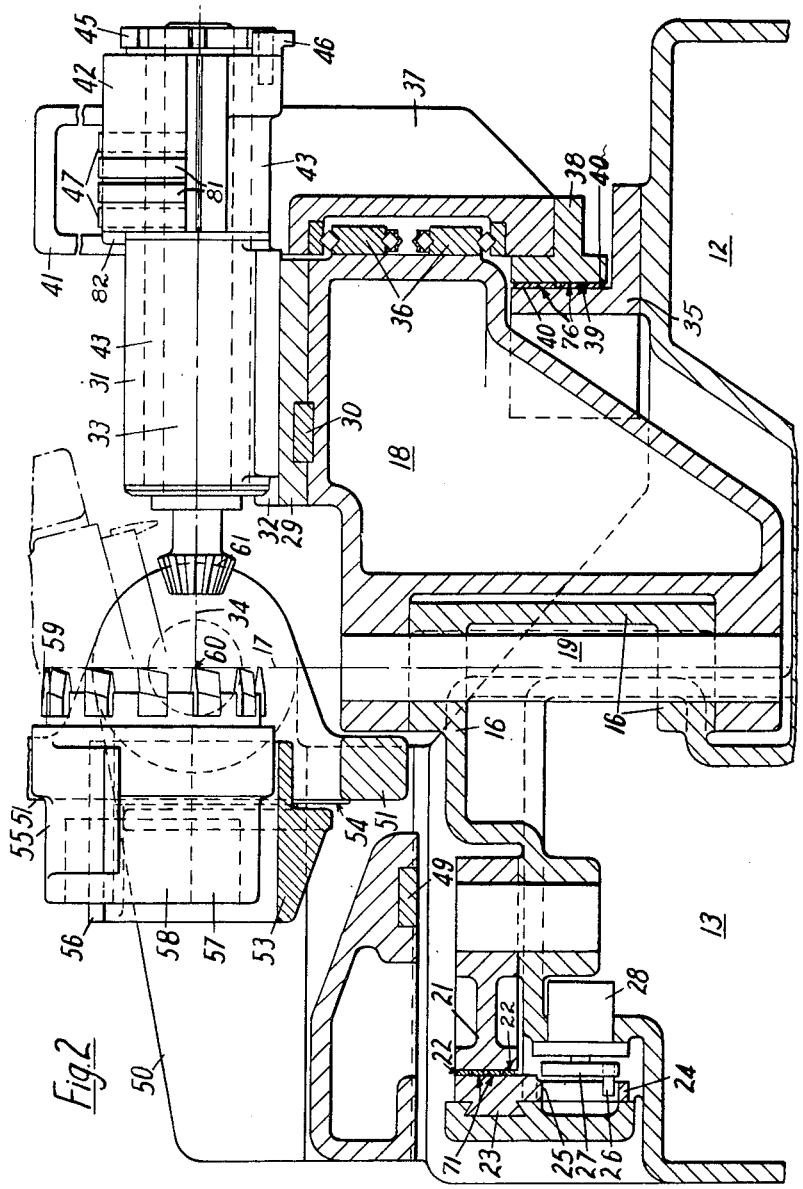

In the accompanying drawings, which are by way of example only:

FIG. 1 is a cut-away perspective view of a preferred machine according to the invention;
FIG. 2 is a sectional side elevation of the machine;
FIG. 3 is a plan view of the machine;
FIG. 4 illustrates diagrammatically one method of infeed which can be employed in operating the machine;
FIG. 5 illustrates diagrammatically an alternative method of infeed which can be employed in operating the machine;
FIG. 6 is a diagrammatic end elevation of a modified machine according to the invention; and
FIG. 7 is a diagrammatic plan view of the mechanism shown in FIG. 6.

Referring now to FIGS. 1 to 3 of the drawings, a machine for producing curved tooth bevel and hypoid gears comprises a bed, indicated generally at 11, formed by a front box structure 12 and a rear box structure 13 spaced apart from one another and joined together by a common base 14 and by side walls 15 in such manner that there is a well between said structures. The front box structure 12 is substantially less in height than the rear box structure 13, and a bearing housing 16 the axis 17 of which is vertical projects into the well from the front face of the rear box structure. A worktable 18 is carried by a vertical shaft 19 journalled in the bearing housing 16, the lower part of said worktable being disposed within the well. The worktable 18 is oscillatable by means of a rod 20 pivotally connected at one end to the worktable and at the other end to an oscillatable quadrant 21 drivably connected in non-slip relation by means of two pairs 22 and 71 of flexible steel tapes to a slide block 23 slidably mounted within the rear box structure 13 and provided with a downwardly extending portion 24 in which there is formed a vertical slot 25. The tapes 22 are secured at 72 to the slide block 23 and at 73 to the quadrant 21, and the tapes 71 are secured at 74 to the slide block 23 and at 75 to the quadrant 21 as shown in FIGURE 3. The slide block 23 is reciprocable by a pin 26 mounted eccentrically in a plate 27 driven by a motor 28, and engaging in the slot 25. The eccentricity of the pin 26 is adjustable.

A slide 29 is adjustable by means of conventional manually operated screw and nut mechanism along rectilinear guides 30 on the horizontal upper surface of the worktable 18, and a sub-slide 31 is likewise adjustable by means of conventional manually operated screw and nut mechanism along rectilinear guides 32 formed on the horizontal upper surface of the slide 29 at right angles to the guides 30. A work spindle 33 is journalled in the sub-slide 31 with its axis 34 horizontal and parallel to the guides 32, and is adapted to have a workpiece 61 secured to it.

Secured to the front box structure 12 is an arcuate portion 35 the centre of curvature of which lies on the axis 17. Said arcuate portion subtends an angle of, say 90 degrees at its centre of curvature. On the front face of the worktable 18, which lies in a vertical plane, there are formed horizontally extending rectilinear guides 36 of recirculating roller type. Slidably mounted on the guides 36 is a member 37 provided with a downwardly extending portion 38 having a rearwardly facing, plane, vertical surface 39 which is elongated in a direction parallel to said guides. The surface 39 is drivably connected in non-slip relation by means of two pairs 40 and 76 of flexible steel tapes to the arcuate portion 35, the tapes 40 being secured at 77 to the surface 39 and at 78 to the arcuate portion 35, and the tapes 76 being secured at 79 to the surface 39 and at 80 to the arcuate portion 35 as shown in FIGURE 3. Thus, oscillation of the worktable 18 about the axis 17 causes the two pairs 40 and 76 of flexible steel tapes (each pair acting only when in tension such that the two pairs act alternately) to reciprocate the member 37 along the guides 36. The composite motion of the member 37 is such that any point on said member moves, relative to the bed 11, in an involute curve the base circle of which coincides with the arcuate portion 35. The member 37 is provided also with two spaced apart portions 41 which extend upwardly to a level above the axis 34. An arcuate portion 42 which subtends an angle of, say, 167 degrees at its centre of curvature is removably secured to a sleeve 43 which surrounds the work spindle 33, said centre of curvature lying on the axis 34. The sleeve 43 is connected to the work spindle 33 by an hydraulically actuated indexing mechanism indicated generally at 44, so that the angular disposition of the work spindle can be varied relative to the sleeve and the arcuate portion 42. The indexing mechanism 44 comprises a peripherally-slotted index plate 45 removably secured to the work spindle 33, and a detent 46 pivotally mounted on the sleeve 43 and adapted to engage in one of the slots in the index plate 45. Said index plate can be changed from one having a different number of slots. The work spindle 33 is angularly movable relative to the sleeve 43 by a hydraulic actuator which is operable only when the detent 46 is disengaged from the index plate 45. The disengagement of the detent from the index plate is effected by an additional hydraulic actuator arranged to operate at appropriate times during the operation of the machine, as hereinafter described. The arcuate portion 42 is oscillatable by means of two pairs 47 and 81 of flexible steel tapes connected between it and two spaced apart vertically adjustable anchor brackets 48 and 82 each of which is carried by one of the upwardly extending portions 41 of the member 37, the tapes 47 and 81 extending in a direction parallel to the guides 36 and those parts of said tapes which are out of contact with the arcuate portion 42 lying in a horizontal plane. The tapes 47 are secured at one end to the anchor bracket 48 and at the other end to the arcuate portion 42, and the tapes 81 are secured at one end to the anchor bracket 82 and at the other end to the arcuate portion 42, as shown in FIGURE 3. Thus, oscillation of the worktable 18 results in a relative oscillation of the work spindle 33, the ratio of the amplitudes of said oscillations being equal to the ratio of the radii of the two arcuate portions 35 and 42, and being adjustable by changing the arcuate portion 42 for one of different radius and making a corresponding adjustment in the vertical position of each of the anchor brackets 48 and 82.

On the horizontal upper surface of the rear box structure 13 there are formed rectilinear guides 49 along which a cutter head 50 is adjustable by means of conventional manually operated screw and nut mechanism in a direction parallel to the front face of said structure. A trunnioned member 51 is angularly adjustable on the cutter head 50, by means of a conventional hydraulic jack, about an axis 52 parallel to the guides 49 and intersecting the axes 17 and 34. A cutter slide 53 is adjustable by means of conventional manually operated screw and nut mechanism, in a direction perpendicular to the direction in which the cutter head 50 is slidable, along rectilinear guides 54 formed on the face of the trunnioned member 51, and a cutter housing 55 is slidable by means of a conventional hydraulic jack along rectilinear guides 56 formed on the cutter slide 53 in a plane perpendicular to the face of the trunnioned member. A motor 57 is mounted in the cutter housing 55 and is drivably connected to a cutter spindle 58 journalled in said housing and adapted to have a face mill cutter 59 secured to it. The arrangement is such that the point of intersection 60 of the axes 52 and 17 can be caused to lie in the plane of the tips of the cutter 59 by appropriate adjustment of the cutter housing 55 on the cutter slide 53. The point 60 will then remain in said plane regardless of adjustment of the cutter spindle 58 either angularly by angular adjustment of the trunnioned member 51 relative to the cutter head 50 or eccentrically with respect to said point by adjustment of the cutter slide 53 on the trunnioned member 51 and/or of the cutter head 50 on the bed 11.

In setting up the machine to generate a bevel pinion, a face mill cutter 59 is secured on the cutter spindle 58, which is adjusted both angularly and eccentrically so that said cutter is positioned to sweep out a surface representing one tooth flank surface of the non-generated wheel with which said pinion is to mate, said wheel being assumed to be located co-axially of the worktable 18 with the apex of its pitch cone at the point 60, as shown at 62 in FIG. 1. The cutter 59 is withdrawn clear of its operative position by sliding the cutter housing 55 on the cutter slide 53 in a direction away from the axis 52, to enable a workpiece 61 to be secured on the work spindle 33, and the sub-slide 31 is adjusted in position on the slide 29 so that the apex of the pitch cone of the workpiece 61 coincides with the point 60. In the case of a hypoid pinion, it is necessary to offset the apex of said pitch cone from the axis 17 by adjustment of the slide 29 relative to the worktable 18. There is secured to the sleeve 43 an arcuate portion 42 which will provide the required oscillation of the work spindle 33 relative to that of the worktable 18, that is to say an arcuate portion 42 the radius of which is in the same ratio to the radius of the arcuate portion 35 as the ratio of the pitch diameter of the pinion to be generated to the pitch diameter of the bevel wheel with which it is to mate. The eccentricity of the pin 26 is adjusted to produce the required amplitude of oscillation of the worktable 18. The anchor brackets 48 and 82 are adjusted vertically to suit the radius of the arcuate portion 42 and the flexible steel tapes 47 and 81 are then connected between said brackets and said arcuate portion. An index plate 45 having the same number of peripheral slots as there are tooth gaps required in the workpiece 61 is secured to the work spindle 33.

When the machine has been set up as described in the preceding paragraph, it operates as follows:

The motor 57 is caused to rotate and thus to drive the cutter 59, and the motor 28 is caused to rotate and thus to oscillate the workpiece 61 about the axis 34 and simultaneously to oscillate the work spindle 33 about the axis 17. Infeed can be provided by movement of the cutter housing 55 relative to the cutter slide 53, in a direction towards the axis 52, until the point 60 lies in the plane of the tips of the cutter 59. This is illustrated diagrammatically by FIG. 4. Alternatively, the trunnioned member 51 can be moved angularly away from its required setting, so as to provide a clearance between the cutter 59 and the workpiece 61 when the point 60 is caused to lie in the plane of the tips of the cutter by adjustment of the cutter housing 55 on the cutter slide 53, and infeed is then provided by moving the trunnioned member 51 angularly back into its required setting. This is illustrated diagrammatically by FIG. 5. One set of tooth flanks is generated on the workpiece 61 by rolling the latter relative to the cutter 59 as though it were meshing with the non-generated wheel with which it is to mate, one tooth flank surface of said wheel being represented by the surface swept out by the rotating cutter. On the completion of each individual tooth flank of said one set, the cutter is withdrawn from the workpiece 61 either by movement of the cutter housing 55 away from the axis 52 or by appropriate angular movement of the trunnioned member 51, to enable the angular displacement of the workpiece relative to the arcuate portion 42 to be varied by one or more tooth pitches by operation of the indexing mechanism. The cutter is then fed back into the workpiece 61 to complete a further tooth flank, and so on until said one set of tooth flanks is completed. The other set of tooth flanks is produced on the workpiece 61 in like manner by a separate operation requiring a cutter of slightly different radius and profile set up with a slightly different eccentricity relative to the point 60.

If desired, the motor 28 can be stopped or otherwise made inoperative and the worktable 18 can be clamped in a fixed position with the axis 34 perpendicular to the axis 52. Gears can then be formed without any generating roll taking place between the workpiece 61 and the cutter 59, indexing being necessary on the completion of each individual tooth space or tooth flank. It is therefore possible to produce a non-generated bevel or hypoid wheel on the machine and then, by changing the cutter 59, unclamping the worktable 18, and starting or making operative the motor 28, to produce a generated pinion which will mate efficiently with said wheel. However, where large numbers of identical gear pairs are to be produced it will obviously be more convenient to have two kinds of machine, namely one constructed as hereinbefore described, for generating the pinions, and one, for forming the wheels, without motor 28, plate 27, pin 26, slide block 23, tapes 22 and 71, quadrant 21, rod 20, oscillatable worktable 18, guides 36, member 37, tapes 40 and 76, arcuate portion 35, brackets 48 and 42, tapes 47 and 81 and arcuate portion 42.

In a modification, illustrated diagrammatically by FIGS. 6 and 7, of the machine shown in FIGS. 1 to 3, the arcuate portion 35, the flexible steel tapes 40 and 76 and the downwardly extending portion 38 of the member 37 are dispensed with and replaced by a vertical pin 62 carried by a bracket 63 secured to the member 37, said pin engaging slidably in a cam slot 64 formed in a plate 65 secured to the front box structure 12. The centerline of the slot 64 is an involute curve, the base circle 70 of which has its centre on the axis 17.

The arcuate portion 42, the anchor brackets 48 and 82 and the upwardly extending portions 41 of the member 37 are also dispensed with and are replaced by a cylinder 66 removably secured to the sleeve 43, a cylinder 67 rotatably and removably mounted on a horizontal dead shaft 68, and two pairs 69 and 83 of flexible steel tapes drivably connecting the cylinder 66 and the member 37 in non-slip relation and embracing the cylinder 67. The tapes 69 are secured at 84 to the member 37 and at 85 to the cylinder 66, and the tapes 83 are secured at 86 to the member 37 and at 87 to the cylinder 66. The dead shaft 68 is mounted on the worktable 18 (which is not shown in FIGS. 6 and 7), below and in the same vertical plane as the work spindle 33, for adjustment in said plane. The member 37 is still slidably mounted on the guides 36, but these are not shown in FIGS. 6 and 7. The modified machine operates in precisely the same manner as the machine shown in FIGS. 1 to 3. The ratio between the amplitude of oscillation of the worktable 18 and the amplitude of oscillation of the work spindle 33 is adjustable by changing the cylinders 66 and 67 for cylinders of different radii and making a corresponding adjustment in the vertical position of the dead shaft 68. The sum of the radius of the upper cylinder and the diameter of the lower cylinder must be constant.

Various other modifications are possible within the scope of the appendant claims. For example, the flexible steel tapes and the arcuate portions or cylinders to which they are connected can be replaced by toothed rack and pinion means, at the risk of introducing backlash into the machine. The face mill cutter can be replaced by twin face mill cutters of equal radius to one another, mounted eccentrically of one another in intermeshing relationship and rotatable in timed relation so that both cutters can operate simultaneously in one tooth space of the workpiece. Bevel and hypoid gears having straight teeth can equally well be produced by providing the cutter housing with reciprocatory cutters instead of a face mill cutter or cutters. The machine can be provided with a grinding wheel or wheels instead of a cutter or cutters, for finishing workpieces consisting of previously cut bevel and hypoid gears.

What I claim is:

1. A machine for producing bevel and hypoid gears by moving a workpiece relative to a tool assembly as though said workpiece were rotating in mesh with a non-generated mating gear of which at least one tooth flank surface is represented by the tool assembly, comprising means for oscillating the workpiece simultaneously about two different axes one of which lies in a plane perpendicular to the other.

2. A machine for producing bevel and hypoid gears comprising a fixed bed; a work table oscillatable about a predetermined axis on said bed; a work spindle carried by the work table about an axis which lies in a plane perpendicular to said predetermined axis; means mounting said spindle for oscillation about its axis; a member carried by the work table for reciprocatory movement at a tangent to a circle, the center of which lies on the axis of the work spindle; means for producing said reciprocatory movement by constraining the member to move, during oscillation of the work table, in such a manner that any point on said member moves, relative to the bed, in an involute curve the center of the base circle of which lies on the axis of the work table; and means for converting reciprocatory movement of the member into oscillatory movement of the work spindle about its axis.

3. A machine for producing bevel and hypoid gears comprising a fixed bed; a work table oscillatable about a predetermined axis on said bed; a work spindle carried by the work table about an axis which lies in a plane perpendicular to said predetermined axis; means mounting said spindle for oscillation about its axis; a member carried by the work table for reciprocatory movement at a tangent to a circle, the center of which lies on the axis of the work spindle; means for producing said reciprocatory movement by constraining the member to move, during oscillation of the work table, in such a manner that any point on said member moves, relative to the bed, in an involute curve the center of the base circle of which lies on the axis of the work table; an arcuate surface connected coaxially to the work spindle; and non-slipping means connecting said surface to the member.

4. A machine for producing bevel and hypoid gears comprising a fixed bed; a work table oscillatable about a predetermined axis on said bed; a work spindle carried by the work table about an axis which lies in a plane perpendicular to said predetermined axis; means mounting said spindle for oscillation about its axis; a member carried by the work table for reciprocatory movement at a tangent to a circle, the center of which lies on the axis of the work spindle; means for producing said reciprocatory movement by constraining the member to move, during oscillation of the work table, in such a manner that any point on said member moves, relative to the bed, in an involute curve the center of the base circle of which lies on the axis of the work table; an arcuate surface connected coaxially to the work spindle; and flexible steel tapes connecting said surface to the member.

5. A machine for producing bevel and hypoid gears comprising a fixed bed; a work table oscillatable about a predetermined axis on said bed; a work spindle carried by the work table about an axis which lies in a plane perpendicular to said predetermined axis; means mounting said spindle for oscillation about its axis; a member carried by the work table for reciprocatory movement at a tangent to a circle, the center of which lies on the axis of the work spindle; means for producing said reciprocatory movement by constraining the member to move, during oscillation of the work table, in such a manner that any point on said member moves, relative to the bed, in an involute curve the center of the base circle of which lies on the axis of the work table; a sleeve connected coaxially to the work spindle by an intermittent indexing mechanism; an arcuate surface secured coaxially to the sleeve; and non-slipping means connecting said surface to the member.

6. A machine for producing bevel and hypoid gears comprising a fixed bed; a work table oscillatable about a predetermined axis on said bed; a work spindle carried by the work table about an axis which lies in a plane perpendicular to said predetermined axis; means mounting said spindle for oscillation about its axis; a member carried by the work table for reciprocatory movement at a tangent to a circle, the center of which lies on the axis of the work spindle; means for producing said reciprocatory movement by constraining the member to move, during oscillation of the work table, in such a manner that any point on said member moves, relative to the bed, in an involute curve the center of the base circle of which lies on the axis of the work table; an arcuate surface connected coaxially to the work spindle and interchangeable with arcuate surfaces of different radii; anchor brackets carried by the member for adjustment in a direction perpendicular to the direction of reciprocation of the member; and non-slipping means connecting the arcuate surface to the anchor brackets.

7. A machine for producing bevel and hypoid gears comprising a fixed bed; a work table oscillatable about a predetermined axis on said bed; a work spindle carried by the work table about an axis which lies in a plane perpendicular to said predetermined axis; means mounting said spindle for oscillation about its axis; a member carried by the work table for reciprocatory movement at a tangent to a circle, the center of which lies on the axis of the work spindle; means for producing said reciprocatory movement by constraining the member to move, during oscillation of the work table, in such a manner that any point on said member moves, relative to the bed, in an involute curve the center of the base circle of which lies on the axis of the work table; a cylinder connected coaxially to the work spindle; another cylinder disposed between the first mentioned cylinder and the member; and non-slipping means connecting the first mentioned cylinder to the member and embracing said other cylinder.

8. A machine for producing bevel and hypoid gears comprising a fixed bed; a work table oscillatable about a predetermined axis on said bed; a work spindle carried by the work table about an axis which lies in a plane perpendicular to said predetermined axis; means mounting said spindle for oscillation about its axis; a member carried by the work table for reciprocatory movement at a tangent to a circle, the center of which lies on the axis of the work spindle; means for producing said reciprocatory movement by constraining the member to move, during oscillation of the work table, in such a manner that any point on said member moves, relative to the bed, in an involute curve the center of the base circle of which lies on the axis of the work table; a cylinder connected coaxially to the work spindle and interchangeable with cylinders of different radii; another cylinder mounted on the work table between the first mentioned cylinder and the member for adjustment in a plane containing the axis of the work spindle and perpendicular to the direction of reciprocation of the member, said other cylinder also being interchangeable with cylinders of different radii; and non-slipping means connecting the first mentioned cylinder to the member and embracing said other cylinder.

9. A machine for producing bevel and hypoid gears comprising a fixed bed; a work table oscillatable about a predetermined axis on said bed; a work spindle carried by the work table about an axis which lies in a plane perpendicular to said predetermined axis; means mounting said spindle for oscillation about its axis; a member carried by the work table for reciprocatory movement at a tangent to a circle, the center of which lies on the axis of the work spindle; a stationary arcuate surface, the center of which lies on the axis of the work table; non-slipping means connecting said surface to the member; and means for converting reciprocatory movement of the member into oscillatory movement of the work spindle about its axis.

10. A machine for producing bevel and hypoid gears comprising a fixed bed; a work table oscillatable about a predetermined axis on said bed; a work spindle carried by the work table about an axis which lies in a plane perpendicular to said predetermined axis; means mounting said spindle for oscillation about its axis; a member carried by the work table for reciprocatory movement at a tangent to a circle, the center of which lies on the axis of the work spindle; a stationary arcuate surface, the center of which lies on the axis of the work table; flexible steel tapes connecting said surface to the member; and means for converting reciprocatory movement of the member into oscillatory movement of the work spindle about its axis.

11. A machine for producing bevel and hypoid gears comprising a fixed bed; a work table oscillatable on said bed; an arcuate member connected to the work table and oscillatable about an axis parallel to the oscillating axis of the work table; a slide block reciprocable by a motor; non-slipping means connecting said arcuate member to the slide block; a work spindle carried by the work table and oscillatable thereon about its own axis which lies in a plane perpendicular to the axis about which the work table is oscillatable; a member carried by the work table for reciprocatory movement at a tangent to a circle, the center of which lies on the axis of the work spindle; means for producing said reciprocatory movement by constraining the member to move, during oscillation of the work table, in such a manner that any point on said member moves, relative to the bed, in an involute curve the center of the base circle of which lies on the axis of the work table; and means for converting reciprocatory movement of the member into oscillatory movement of the work spindle about its axis.

12. A machine for producing bevel and hypoid gears comprising a fixed bed; a work table oscillatable on said bed; an arcuate member connected to the work table and oscillatable about an axis parallel to the axis of the work table; a slide block reciprocable by a motor; flexible steel tapes connecting said arcuate member to the slide block; a work spindle carried by the work table and oscillatable thereon about its own axis which lies in a plane perpendicular to the axis about which the work table is oscillatable; a member carried by the work table for reciprocatory movement at a tangent to a circle, the center of which lies on the axis of the work spindle; means for producing said reciprocatory movement by constraining the member to move, during oscillation of the work table, in such a manner that any point on said member moves, relative to the bed, in an involute curve the center of the base circle of which lies on the axis of the work table; and means for converting reciprocatory movement of the member into oscillatory movement of the work spindle about its axis.

13. A machine for producing bevel and hypoid gears comprising a fixed bed; a work table oscillatable on said bed; an arcuate member connected to the work table and oscillatable about an axis parallel to the axis of the work table; a motor driving a crank pin of adjustable throw; a slide block having a slot extending at right angles to the direction of reciprocation of said block and in which the crank pin engages; non-slipping means connecting said arcuate member to the slide block; a work spindle carried by the work table and oscillatable thereon about its own axis which lies in a plane perpendicular to the axis about which the work table is oscillatable; a member carried by the work table for reciprocatory movement at a tangent to a circle, the center of which lies on the axis of the work spindle; means for producing said reciprocatory movement by constraining the member to move, during oscillation of the work table, in such a manner that any point on said member moves, relative to the bed, in an involute curve the center of the base circle of which lies on the axis of the work table; and means for converting reciprocatory movement of the member into oscillatory movement of the work spindle about its axis.

14. A machine for producing bevel and hypoid gears comprising a fixed bed; a work table oscillatable about a predetermined axis on said bed; a work spindle carried by the work table about an axis which lies in a plane perpendicular to said predetermined axis; means mounting said spindle for oscillation about its axis; a member carried by the work table for reciprocatory movement at a tangent to a circle, the center of which lies on the axis of the work spindle; a cam and follower connection between the member and the bed; and means for converting reciprocatory movement of the member into oscillatory movement of the work spindle about its axis.

15. A machine for producing bevel and hypoid gears comprising a fixed bed; a work table oscillatable about a predetermined axis on said bed; a work spindle carried by the work table about an axis which lies in a plane perpendicular to said predetermined axis; means mounting said spindle for oscillation about its axis; a member carried by the work table for reciprocatory movement at a tangent to a circle, the center of which lies on the axis of the work spindle; means secured to the bed defining an involute cam slot, the center of the base circle of the involute lying on the axis of the work table; a follower secured to the member and engaging in the involute cam slot; and means for converting reciprocatory movement of the member into oscillatory movement of the work spindle about its axis.

16. A machine for producing bevel and hypoid gears comprising a tool assembly representing at least one tooth flank surface of a non-generated gear; a member carrying the tool assembly and pivotable about an axis passing through the apex of the pitch cone of the non-generated gear; and means for oscillating a workpiece simultaneously about two different axes one of which lies in a plane perpendicular to the other.

17. A machine for producing bevel and hypoid gears comprising a fixed bed; a work table oscillatable about a predetermined axis on said bed; a work spindle carried by the work table about an axis which lies in a plane perpendicular to said predetermined axis; means mounting said spindle for oscillation about its axis; a member carried by the work table for reciprocatory movement at a tangent to a circle, the center of which lies on the axis of the work spindle; means for producing said reciprocatory movement by constraining the member to move, during oscillation of the work table, in such a manner that any point on said member moves, relative to the bed, in an involute curve the center of the base circle of which lies on the axis of the work table; means for converting reciprocatory movement of the member into oscillatory movement of the work spindle about its axis; a tool assembly representing at least one tooth flank surface of a non-generated gear; and a member carrying the tool assembly and pivotable about an axis which passes through the apex of the pitch cone of the non-generated gear and intersects the axes of the work table and the work spindle.

References Cited by the Examiner

UNITED STATES PATENTS 2,773,429  12/56  Wildhaber _____ 90—5

ANDREW R. JUHASZ, *Primary Examiner.*

LEON PEAR, *Examiner.*